United States Patent
Hwang

(10) Patent No.: US 6,792,770 B2
(45) Date of Patent: Sep. 21, 2004

(54) ICE MAKER WITH TRAYS HAVING RIGID ICE MAKING RECESSES

(75) Inventor: Ji-Sick Hwang, Yangsan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/395,096

(22) Filed: Mar. 25, 2003

(65) Prior Publication Data

US 2004/0040333 A1 Mar. 4, 2004

(30) Foreign Application Priority Data

Aug. 31, 2002 (KR) .................................. 2002-0052314

(51) Int. Cl.[7] .............................................. F25C 1/10
(52) U.S. Cl. ..................................... 62/351; 62/353
(58) Field of Search .................................. 62/351, 353

(56) References Cited

U.S. PATENT DOCUMENTS

| | | | |
|---|---|---|---|
| 2,054,074 A | * | 9/1936 | Field .............................. 62/73 |
| 2,381,069 A | * | 8/1945 | Lutes et al. .................... 62/353 |
| 2,385,539 A | | 9/1945 | Pownall |
| 2,664,592 A | | 1/1954 | Ingraham et al. |
| 2,718,124 A | * | 9/1955 | Gilliam .......................... 62/73 |
| 2,531,087 A | | 11/1959 | Tharaldsen |
| 3,253,425 A | * | 5/1966 | McKissick .................... 62/345 |
| 5,425,248 A | * | 6/1995 | Trantina ....................... 62/349 |
| 2001/0000276 A1 | | 10/2001 | Shapiro et al. |

FOREIGN PATENT DOCUMENTS

JP  2000-088414  3/2000

* cited by examiner

*Primary Examiner*—William E. Tapolcai
(74) *Attorney, Agent, or Firm*—Staas & Halsey LLP

(57) ABSTRACT

An ice maker having an ice making conveyor includes a pair of pulleys spaced apart from each other by a desired distance, a drive unit rotating the pulleys, a plurality of tray cells provided with ice making recesses capable of containing water, and an ice making conveyor formed by the tray cells coupled to one another, the ice making conveyor being wound around the pulleys. The ice making recesses are formed by a rigid body made of a metal material. A heater is arranged to apply heat to the tray cells, thereby separating ice from the tray cells. Accordingly, the ice maker exhibits a reduced occurrence of damage during ice making and separating processes while having an effect of achieving easy ice making and separating processes.

11 Claims, 4 Drawing Sheets

ICE MAKER WITH TRAYS HAVING RIGID ICE MAKING RECESSES

CROSS-REFERENCE TO RELATED APPLICATIONS

This application claims the benefit of Korean Application No. 2002-52314, filed Aug. 31, 2002, in the Korean Intellectual Property Office, the disclosure of which is incorporated herein by reference.

BACKGROUND OF THE INVENTION

1. Field of the Invention

The present invention relates to an ice maker, and more particularly, to an ice maker provided with an ice making conveyor.

2. Description of the Related Art

As is well known, refrigerators or automatic dispensers are equipped with ice makers and are adapted to make ice using water supplied thereto.

Referring to FIG. 1, a conventional ice maker is illustrated which is disclosed in Japanese Patent Laid-open Publication No. 2000-88414. As shown in FIG. 1, the conventional ice maker includes a pair of rollers, that is, a drive roller 1 and a driven roller 2, spaced apart from each other by a desired distance, a motor actuator 3 equipped with a motor (not shown), and adapted to rotate the drive roller 1, and an ice making belt 4 wound around the drive and driven rollers 1 and 2. The ice making belt 4 is provided with ice making recesses 5 made of a flexible material.

The ice making belt 4 has engagement holes 6 formed along lateral edges thereof, whereas each of the drive and driven rollers 1 and 2 is provided with engagement protrusions 7 engagable with the engagement holes 6. The ice making belt 4 can receive drive power from the drive roller 1 in accordance with the engagement between the engagement holes 6 and engagement protrusions 7.

When the motor actuator 3 is operated to rotate the drive roller 1, ice is made in accordance with the freezing of water in the ice making recesses 5 provided at the ice making belt 4, and the drive roller 1 deforms the shape of the ice making recesses 5 made of a flexible material, thereby causing ice to be separated from the ice making recesses 5.

For such a separation of ice from the ice making recesses 5 in the above mentioned ice maker, those ice making recesses 5 are made of a thin synthetic resin structure such as a film to provide a desired flexibility. However, where the ice making recesses 5 are made of a thin synthetic resin structure having flexibility, the recesses may be easily damaged due to being subjected to a repeated deformation in accordance with repeated ice making and separating processes. In particular, since the ice maker is typically installed in a freezing chamber maintained at a low temperature state to freeze water, the hardening of the ice making recesses 5 is accelerated by cold air in the freezing chamber. For this reason, the possibility of damage to the ice making recesses 5 is further increased.

SUMMARY OF THE INVENTION

Therefore, an aspect of the present invention is to provide an ice maker capable of preventing ice making recesses from being damaged.

Additional objects and advantages of the invention will be set forth in part in the description which follows and, in part, will be obvious from the description, or may be learned by practice of the invention.

In accordance with the present invention, prevention of damage to the ice making recesses is accomplished by providing an ice maker that includes a pair of pulleys spaced apart from each other by a desired distance, a drive unit rotating the pulleys, a plurality of tray cells provided with ice making recesses capable of containing water, and an ice making conveyor formed by the tray cells coupled to one another, where the ice making conveyor is wound around the pulleys.

The ice making recesses may be made substantially of a rigid body to prevent being deformed even when subjected to an external force.

In one aspect, each of the tray cells is made of a metal material and includes an ice making section provided with at least one of the ice making recesses and a feeding section that is adapted to support the ice making section and is hingeably coupled at opposite ends thereof to the tray cells arranged adjacent thereto. The feeding section receives drive power from the pulleys and moves around the pulleys along with the ice making section.

In one aspect, each of the tray cells is provided at opposite ends thereof with a hinge protrusion and a hinge hole, respectively. The hinge protrusion and the hinge hole are coupled with a hinge hole provided at an adjacent one of the tray cells and a hinge protrusion provided at another adjacent one of the tray cells, respectively.

In one aspect, the feeding section has a pair of feeding plates spaced apart from each other by a predetermined desired distance to obtain a desired width of the feeding section and a support pin that has opposite ends supported by the feeding plates while maintaining a desired distance between the feeding plates.

In one aspect, each of the feeding plates has opposite ends, each having an arc shape with a desired radius of curvature. One of the ends of the feeding plate has a width that is less than a width of the other end of the feeding plate and is coupled to the other end of an adjacent feeding plate inside the adjacent feeding plate.

The ice maker may further comprise a heater arranged inside the ice making conveyor, where the heater is adapted to apply heat to at least a part of the tray cells that have ice making recesses facing downward to separate ice from the tray cells.

The tray cells may be provided with feeding protrusions or feeding grooves engageable with the feeding protrusions, and the pulleys may be provided with those of the feeding protrusions and feeding grooves not provided at the tray cells, so that the tray cells receive a force from the pulleys via the feeding protrusions and the feeding grooves.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
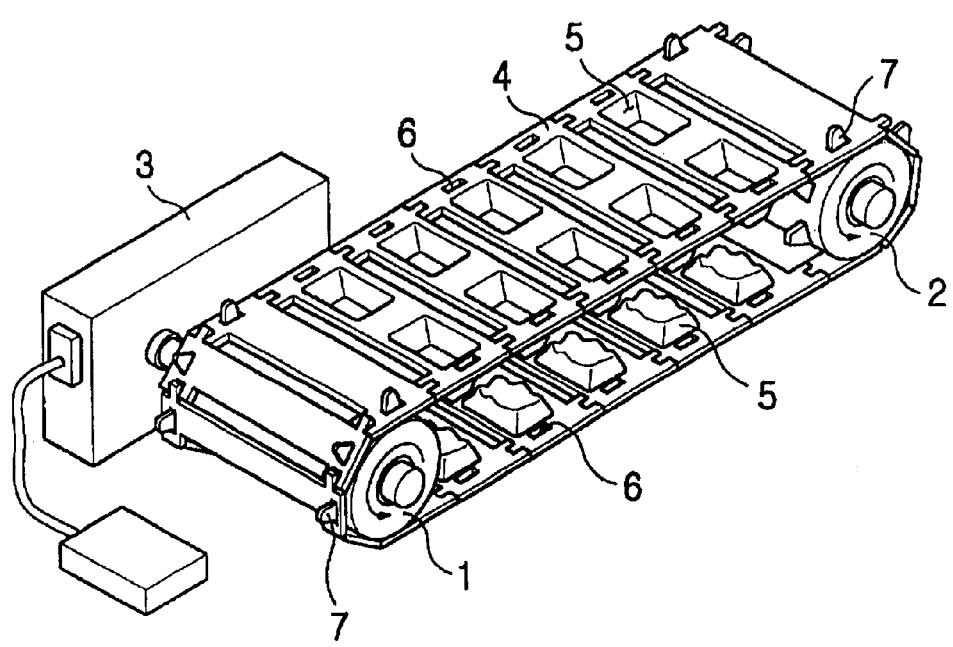
FIG. 1 is a perspective view illustrating a conventional ice maker.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
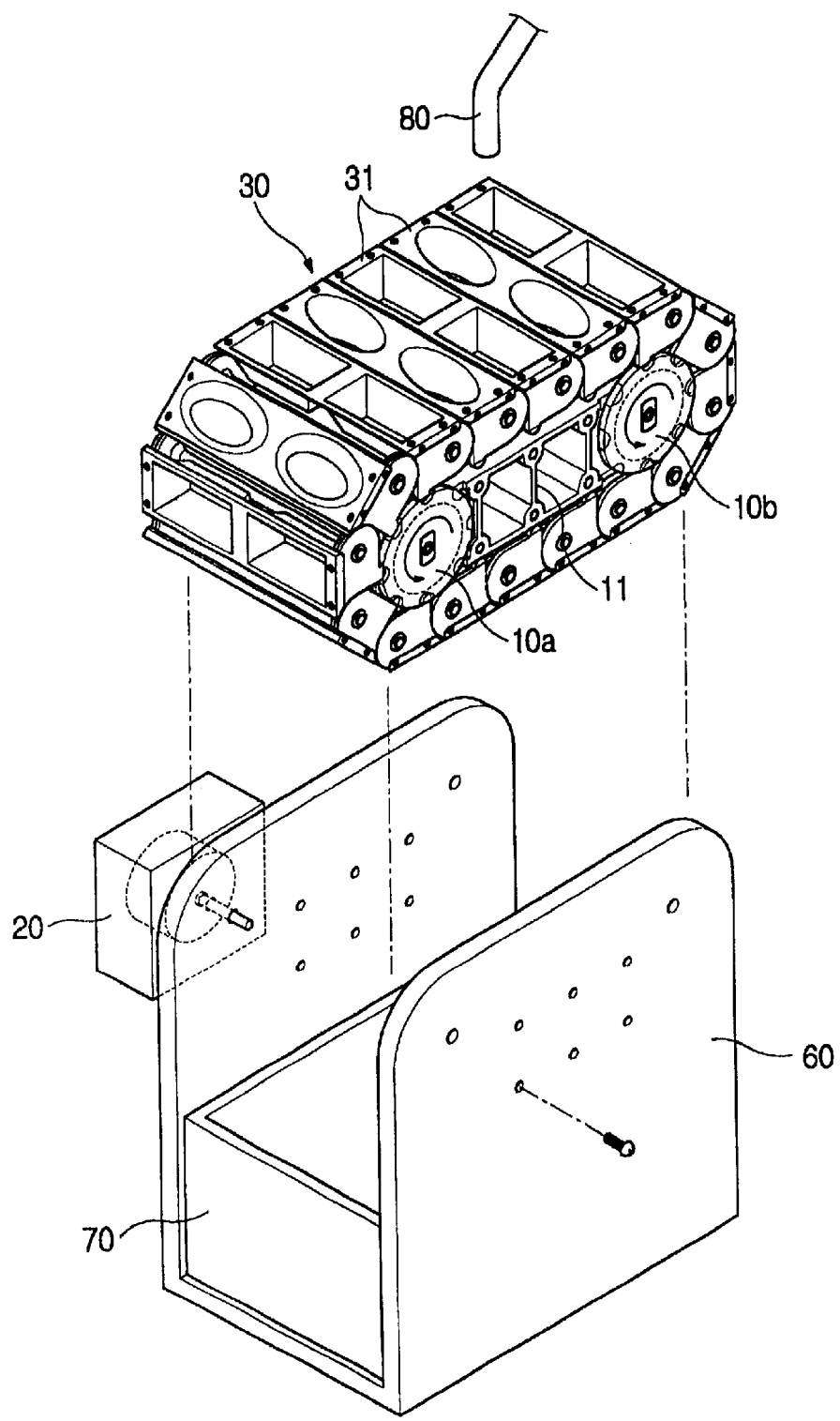
FIG. 2 is a perspective view illustrating the configuration of an ice maker according to an embodiment of the present invention.
Figure 3:
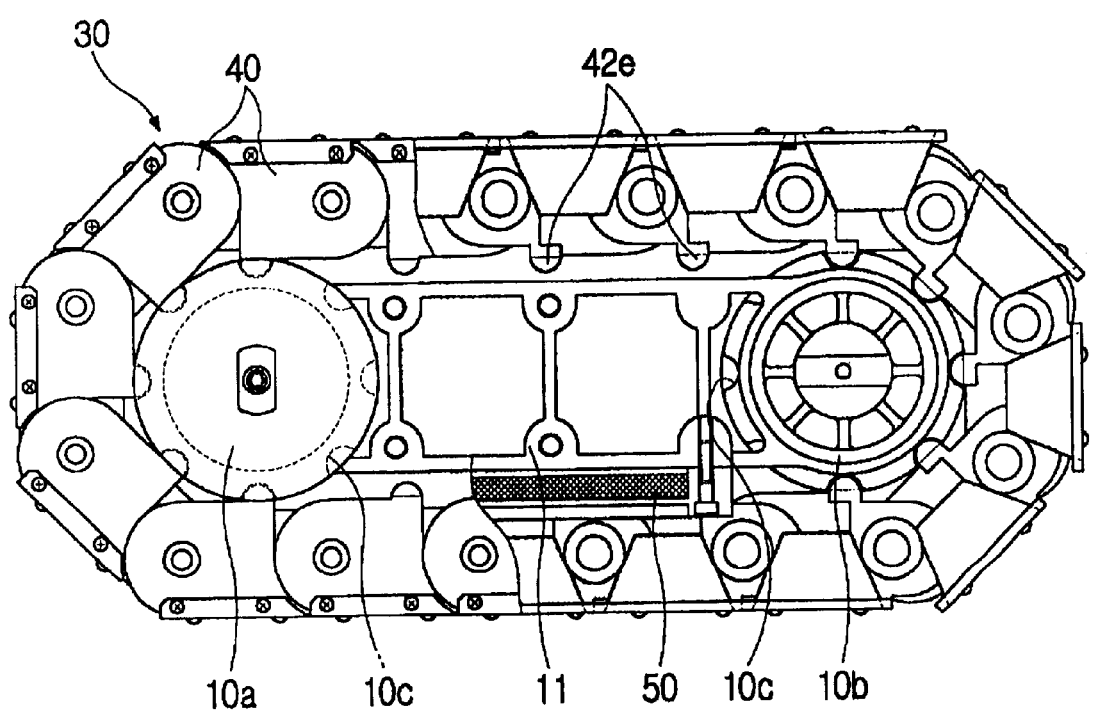
FIG. 3 is a side view illustrating the ice maker according to of FIG. 2.

Referring to FIGS. 2 and 3, an ice maker according to an embodiment of the present invention is illustrated. A pair of pulleys 10a and 10b are spaced apart from each other by a desired distance. A drive unit 20 is utilized for rotating the pulleys 10a and 10b, and an ice making conveyer 30 is wound around the pulleys 10a and 10b.

The pulley 10a is a drive pulley adapted to rotate by drive power transmitted from the drive unit 20, and the pulley 10b is a driven pulley adapted to rotate by the drive power transmitted from the drive pulley 10a. The drive and driven pulleys 10a and 10b are mounted to opposite ends of a support bracket 11 and are spaced apart from each other by a desired distance by virtue of the support bracket 11.

Figure 4:
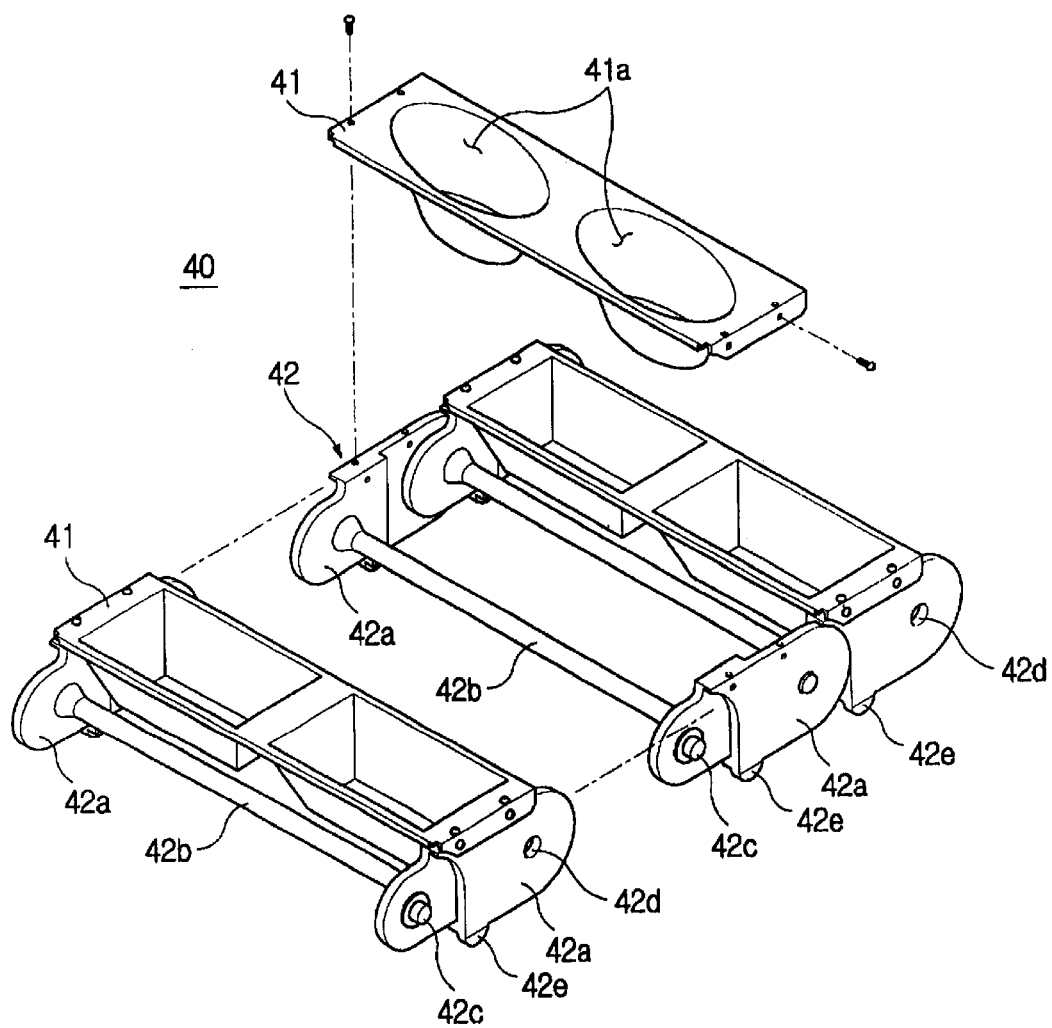
FIG. 4 is a perspective view illustrating the configuration of tray cells included in the ice maker of FIG. 2.

The ice making conveyer 30 includes a plurality of tray cells 40 connected to one another to form an endless conveyer. As shown in FIG. 4, each tray cell 40 includes an ice making section 41 provided with at least one ice making recess 41a for containing water to be frozen. A feeding section 42 of each tray cell 40 is adapted to support the ice making section 41 while moving around the pulleys 10a and 10b along with the ice making recess 41a in accordance with the drive power transmitted from the drive pulley 10a.

In the illustrated embodiment, the ice making section 41 is provided with a pair of ice making recesses 41a, each made of a rigid body having a desired strength to prevent deformation or damage. As shown in FIG. 4, the ice making section 41 and ice making recesses 41a are made of a metal material, for example, stainless steel. Accordingly, the present invention prevents deformation and damage of the ice making section 41 and ice making recesses 41a while allowing an easy transmission of heat and cold air.

Meanwhile, each feeding section 42 includes a pair of feeding plates 42a, and a support pin 42b connecting the feeding plates 42a, while maintaining a predetermined desired distance between the feeding plates 42a. Each feeding plate 42a is provided at opposite ends thereof with a hinge protrusion 42c and a hinge hole 42d, respectively, to provide coupling to adjacent ones of the tray cells. As shown in FIG. 4, the hinge protrusion 42c is provided at an upstream end of an associated feeding plate 42a, whereas the hinge hole 42d is provided at a downstream end of the associated feeding plate 42a. The hinge protrusion 42c of one tray cell 40 is coupled to the hinge hole 42d of a tray cell 40 that is adjacent to the one tray cell 40, whereas the hinge hole 42d of the one tray cell 40 is coupled to the hinge protrusion 42c of a next tray cell 40. Thus, the ice making conveyer 30, which has an endless structure, is obtained.

Each feeding plate 42a has, at its both ends, an arc shape having a desired radius of curvature to allow the ice making conveyor 30 to rotate smoothly while being bent along the circumferential surfaces of the drive and driven pulleys 10a and 10b. The end of each feeding plate 42a provided with the hinge protrusion 42c has a width that is less than a width of the end of the corresponding feeding plate 42a provided with the hinge hole 42d to permit coupling, inside the adjacent feeding plate 42a, to the end of the adjacent feeding plate 42a provided with the hinge hole 42d.

In order to make each tray cell 40 easily receive the drive power from the drive pulley 10a, a feeding protrusion 42e is protruded from each feeding plate 42a of the feeding section 42. Each of the drive and driven pulleys 10a and 10b is provided at its circumferential surface with a plurality of uniformly spaced feeding grooves 10c (FIG. 3) adapted to engage with the feeding protrusions 42e of the feeding plates 42a. Accordingly, the drive power from the drive pulley 10a is transmitted to the tray cells 40 via the feeding protrusions 42e and feeding grooves 10c, to rotate the tray cells 40 around the drive and driven pulleys 10a and 10b.

Referring again to FIG. 3, the ice maker of the present invention further includes a heater 50 for separating ice from the ice making section 41. The heater 50 is arranged beneath the support bracket 11 to generate heat when it receives electric power and heat the tray cells 40 with the ice making recesses facing downward.

The ice maker may be installed in a freezing chamber with both ends of its support bracket 11 supported by the inner wall of the freezing chamber. As shown in the embodiment of FIG. 2, a U-shaped fixing bracket 60 is fixedly mounted to the inner wall of the freezing chamber to support the ice maker by supporting each end of the support bracket 11 at opposite lateral sides of the support bracket 11.

A storage tray 70 is arranged beneath the ice maker in order to contain the ice made by the ice maker. A water supply tube 80 is arranged over the ice maker to supply water to the tray cells 40.

As shown in FIGS. 3 and 4, each feeding protrusion 42e is provided at an associated tray cell 40, and the feeding grooves 10c are provided at each of the pulleys 10a and 10b. However, in another embodiment, it is possible to provide the feeding grooves 10c at the tray cells 40 while providing the feeding protrusions 42e at the pulleys 10a and 10b.

The operation, function and effect of the ice maker having the above described configuration will be described in detail.

First, water is supplied, via the water supply tube 80, to the tray cells 40 with the ice making recesses 40a facing upward. Since the ice maker is arranged in the freezing chamber of a refrigerator, cold air freezes the water in the ice making recesses 41a after a desired time elapses.

In order to separate the ice from the tray cells 40, the ice making conveyor 30 is moved in accordance with operations of the drive unit 20 and two pulleys 10a and 10b. That is, when the drive unit 20 operates by electric power applied thereto, the drive pulley 10a is rotated, moving the ice making conveyer 30 in accordance with the engagement between the feeding grooves 10c provided at the circumferential surface of the drive pulley 10a and the feeding protrusions 42e provided at the tray cells 40. When the ice-made tray cells 40 are positioned beneath the heater 50, heat generated from the heater 50 is applied to the tray cells 40 to heat the ice making section 41 and ice making recesses 41a of the tray cells 40. The ice made in each ice making recess 41a is thawed at a surface contacting the ice making recess 41a by the heat transmitted from the heater 50 to separate the ice from the ice making recess 41a by a weight of the ice. As a result, the ice falls downward and is stored in the storage tray 70.

As is apparent from the above description, the ice maker of the present invention exhibits a reduced occurrence of damage even after a prolonged use because the ice making recesses have a rigid body made of a metal material. In particular, heat or cold air is easily transmitted to water or ice received in the ice making recesses because the material of the ice making recesses exhibits a superior thermal transfer rate as compared to synthetic resin materials. Accordingly, the ice maker of the present invention provides convenient ice making and separating processes.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An ice maker comprising:
    a pair of pulleys spaced apart from each other by a desired distance;
    a drive unit rotating the pulleys;
    a plurality of tray cells provided with ice making recesses to contain water; and
    an ice making conveyor formed by the tray cells coupled to one another, the ice making conveyor being wound around the pulleys,
    wherein the ice making recesses are substantially made of a rigid body so that they are not deformed even when they are subjected to an external force,
    wherein each of the tray cells includes an ice making section provided with at least one of the ice making recesses and a feeding section that is hingeably coupled at opposite ends thereof to adjacent tray cells, and
    wherein the feeding section comprises a pair of feeding plates spaced apart by a predetermined desired distance to obtain a desired width of the feeding section and a support pin having opposite ends supported by the feeding plates while maintaining the predetermined distance between the feeding plates.

2. The ice maker according to claim 1, wherein each of the tray cells is made of a metal material and the feeding section is adapted to support the ice making section, the feeding section and the ice making section receiving drive power from the pulleys to move around the pulleys.

3. The ice maker according to claim 2, wherein each of the tray cells is provided at opposite ends thereof with a hinge protrusion and a hinge hole, respectively, to couple the hinge protrusion with a hinge hole provided at an adjacent one of the tray cells and to couple the hinge hole with a hinge protrusion provided at another adjacent one of the tray cells, respectively.

4. The ice maker according to claim 3, wherein each of the feeding plates has opposite ends, each end having an arc shape with a desired radius of curvature, and one of the ends of the feeding plate has a width less than a width of the other end of the feeding plate to couple inside the adjacent feeding plate by coupling to a wider end of an adjacent one of the feeding plates.

5. The ice maker according to claim 1, further comprising:
    a heater arranged inside the ice making conveyor to apply heat to at least a part of the tray cells with the ice making recesses facing downward to separate ice from the tray cells.

6. The ice maker according to claim 1, wherein the tray cells are provided with one of feeding protrusions and feeding grooves, and the pulleys are provided with the other of the feeding grooves and feeding protrusions not provided at the tray cells to provide a force from the pulleys via the feeding protrusions and the feeding grooves.

7. An ice making conveyor comprising:
    a plurality of metal tray cells having rigid ice making recesses;
    a looped pulley having the metal tray cells disposed therein;
    a drive unit, coupled to the looped pulley, to drive the looped pulley; and
    a heater, disposed beneath a section of the looped pulley, to heat proximate metal tray cells in an upside down orientation to release at least some ice from the metal tray cells,
    wherein each of the tray cells includes an ice making section provided with at least one of the ice making recesses and a feeding section that is adapted to support the ice making section, and
    wherein the feeding section comprises a pair of feeding plates spaced apart by a predetermined desired distance to obtain a desired width of the feeding section and a support pin having opposite ends supported by the feeding plates while maintaining the predetermined distance between the feeding plates.

8. The ice making conveyor according to claim 7, wherein each of the tray cells is provided at opposite ends thereof with a hinge protrusion and a hinge hole, respectively, to couple the hinge protrusion with a hinge hole provided at an adjacent one of the tray cells and to couple the hinge hole with a hinge protrusion provided at another adjacent one of the tray cells, respectively.

9. The ice making conveyor according to claim 7, wherein each of the feeding plates has opposite ends, each end having an arc shape with a desired radius of curvature, and one of the ends of the feeding plate has a width less than a width of the other end of the feeding plate to couple inside the adjacent feeding plate by coupling to a wider end of an adjacent one of the feeding plates.

10. The ice making conveyor according to claim 9, wherein the tray cells are provided with one of feeding protrusions and feeding grooves, and the pulleys are provided with the other of the feeding grooves and feeding protrusions.

11. The ice maker according to claim 10, wherein each of the feeding plates has opposite ends, each end having an arc shape with a desired radius of curvature, and one of the ends of the feeding plate has a width less than a width of the other end of the feeding plate to couple inside the adjacent feeding plate by coupling to a wider end of an adjacent one of the feeding plates.

* * * * *

UNITED STATES PATENT AND TRADEMARK OFFICE
CERTIFICATE OF CORRECTION

PATENT NO. : 6,792,770 B2
DATED : September 21, 2004
INVENTOR(S) : Ji-Sick Hwang It is certified that error appears in the above-identified patent and that said Letters Patent is hereby corrected as shown below:

Title page,
Item [56], References Cited, U.S. PATENT DOCUMENTS, change "2001/0000276 A1" to -- 2001/0027654 A1 --.

Signed and Sealed this

Twenty-sixth Day of July, 2005

JON W. DUDAS
*Director of the United States Patent and Trademark Office*